Aug. 30, 1955    L. E. SCOTT ET AL    2,716,334
FLEXIBLE SHAFT COUPLINGS
Filed Feb. 20, 1951
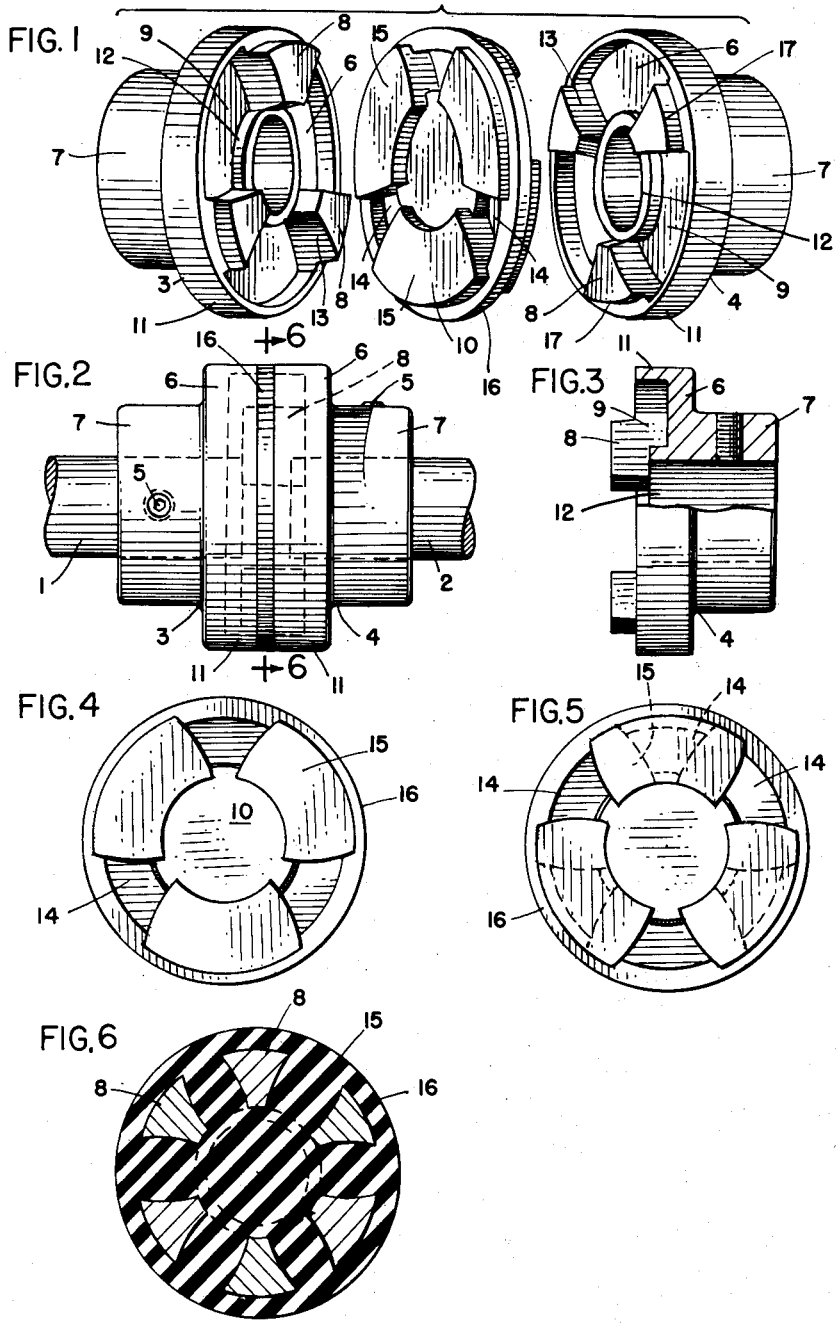
INVENTORS:
LEONARD E. SCOTT
ROBERT I. ISACKSON
BY
ATT'YS United States Patent Office 2,716,334
Patented Aug. 30, 1955

2,716,334

FLEXIBLE SHAFT COUPLINGS

Leonard Edward Scott, Oak Park, and Robert I. Isackson, Forest Park, Ill., assignors to Globe Flexible Coupling Company, Forest Park, Ill., a partnership Application February 20, 1951, Serial No. 211,858

1 Claim. (Cl. 64—14)

This invention relates to flexible couplings for power transmission shafts under conditions where there is difficulty in obtaining constant, exact alinement of the shafts due to load conditions, or other factors.

The main objects of this invention are to provide an improved form of shaft coupling comprising rigid interlapping coupling members with an interposed flexible torque transmitting unit; to provide improved means on the metal coupling members for confining the torque transmitting portions of the resilient unit so as to enable them to take compression strains without any tendency to squeeze out or flow into unoccupied spaces and without risk of having metal-to-metal contact between the coupling members occur through disturbance of the shaft alinement; to provide an improved coupling which is easily assembled and in which the resilient torque transmission unit is readily replaceable without requiring special skill; and to provide an improved coupling in which the torque transmitting surfaces are of maximum extent and arranged so as to be conducive to long life and resistance to wear of the torque transmission unit.

A specific embodiment of this invention is shown in the accompanying drawings in which:

Figure 1 is a exploded view showing the members of the coupling in perspective and spaced apart to show the complementary relation of their interfitting surfaces.

Fig. 2 is a side elevation of the coupling in its normally assembled form.

Fig. 3 is a side elevation partly in section of one of the coupling members.

Fig. 4 is one face view of the resilient torque transmission unit.

Fig. 5 is a similar view of the other face of the same, and indicating by broken lines the relative location of the driving lug sockets of the opposite face.

Fig. 6 is a section through the assembled coupling taken on the line 6—6 of Fig. 2.

In the drawings, the shafts 1 and 2 are shown in exact axial alinement with each other which is the ideal condition that determines the shape of the parts of the coupling, but it is to be understood that the device is intended to take care of circumstances in which the shafts may be slightly out of exact co-axial alinement without affecting the practical operation of the coupling in transmitting motion from one shaft to the other.

In the form shown, the main coupling members 3 and 4 are identical in all respects and are mounted in opposed relation to each other on the ends of their respective shafts to which they are secured against rotation, as for example, by pins 5.

Each of these coupling members comprises a wheel or disc 6 carried by a hub 7. Each of the discs 6 has projecting therefrom three sector-shaped driving lugs 8 symmetrically arranged about the axis with sector-shaped pockets 9 between their sides. The pockets 9 are blind at the disc 6 and are of considerably greater angular width than that of the lugs 8.

When the members are assembled, as in Fig. 2, the lugs 8 of one coupling member interlap symmetrically with those of the other coupling member as will be seen from Figs. 1 and 6. A resiliently yieldable torque transmission element 10 is interposed between and in driving relation with the coupling members.

Each of the discs 6 has integrally formed thereon an outer cylindrical flange 11 surrounding the lugs 8 and sockets 9. The axial length of the flange 11 is about half that of the lugs 8. An inner cylindrical flange 12 adjacent the shaft bore has an axial length slightly less than that of the outer cylindrical flange 11. These flanges are concentric with the axis of the coupling. The radially disposed side faces 13 of the lugs 8 are concavely curved.

It is desirable to have the lugs 8 of one coupling member overlap the lugs 8 of the other coupling member to a maximum extent. To this end the lugs 8 extend beyond the end of their integral flange 11 and into the space enclosed by the flange 11 of the other coupling member. The outer surfaces 17 of the lugs 8 are offset inward from the inner rim of the cylindrical flange 11 so as to prevent any possibility of these lugs on one coupling member 3 or 4 coming into contact with the cylindrical flange on the other member 4 or 3, as the case may be.

The resilient torque transmission element 10 comprises a unitary mass of rubber or the like, shaped as shown by Figs. 1, 4, 5 and 6 so as to completely fill all the spaces between the opposed faces and overlapping surfaces of the coupling members 3 and 4. On its opposite faces this element has blind sockets 14 shaped to receive and fit the lugs 8 and has sector-shaped portions 15 of rubber that are identical in shape to the sockets 9 between the lugs 8.

The element 10 has a flange 16 extending radially outward beyond the outer margins of the bodies 15. This flange 16 fits between the opposed edges of the cylindrical flanges 11 of the coupling members and is of sufficient thickness in an axial direction to space the opposed flanges 11 safely apart. The axial length of the lugs 8 is somewhat greater than the combined axial lengths of the flanges 11 and 16.

The torque transmitting element 10 is preferably made of a tough and hard but resilient rubber composition and comprises a unitary mass shaped to fit and completely fill all of the spaces between the opposed coupling members. The metal parts of the wheel members of the coupling are shaped so as to enclose the rubber mass in such a way as to prevent the same from flowing out of a space where it is subjected to pressure. There are no points in the structure where there can be metal-to-metal contact between the wheel members of the coupling even under the most extreme conditions of untrue alinement of the shafts that are likely to occur in practice.

Although but one specific embodiment of this invention is herein shown and described, it will be understood that details of the structure shown may be altered or omitted without departing from the spirit of the invention as defined by the following claim.

We claim:

In a flexible coupling, a pair of similar axially opposed shaft coupling members each comprising a disc having concentrically spaced inner and outer cylindrical flanges, a plurality of like radially disposed driving lugs connecting said cylindrical flanges and extending from said disc axially outward beyond said flanges, said lugs being of sector-shaped cross setion of substantially less angular width than the spaces between them, each of said lugs having generally radially concave faces and a flexible torque transmitting disc of resiliently compressible material interposed between said coupling members, having sockets in its opposite faces fitting said lugs of said coupling members and arranged to receive said lugs in overlapping axial relation with the lugs of one coupling member symmetrically spaced from and alternately interposed between the lugs of the other coupling member, and said flexible torque transmitting disc being shaped to fill all spaces between the opposed coupling members in the annular space between said flanges.

References Cited in the file of this patent

UNITED STATES PATENTS

| | | |
|---|---|---|
| 1,310,845 | Simms | July 22, 1919 |
| 1,417,432 | Walker | May 23, 1922 |
| 2,025,829 | Ricefield | Dec. 31, 1935 |
| 2,449,654 | Jessop | Sept. 21, 1948 |